(12) United States Patent
McCulloch

(10) Patent No.: US 6,490,500 B1
(45) Date of Patent: Dec. 3, 2002

(54) VISUAL DRAG DIAGNOSTIC APPARATUS AND METHOD

(75) Inventor: Joseph W. McCulloch, Bellefonte, PA (US)

(73) Assignee: Paradyne, State College, PA (US)

( * ) Notice: Subject to any disclaimer, the term of this patent is extended or adjusted under 35 U.S.C. 154(b) by 0 days.

(21) Appl. No.: 09/322,894

(22) Filed: May 29, 1999

Related U.S. Application Data
(60) Provisional application No. 60/087,443, filed on Jun. 1, 1998.

(51) Int. Cl.[7] .............................................. G06F 19/00
(52) U.S. Cl. ....................... 700/175; 700/180; 700/177; 318/565
(58) Field of Search ........................ 700/80, 174, 175, 700/177, 180, 184; 702/33, 41, 44; 318/565, 566, 567, 572

(56) References Cited

U.S. PATENT DOCUMENTS

| | | | | |
|---|---|---|---|---|
| 3,576,979 A | * | 5/1971 | McCall et al. ................. | 700/80 |
| 4,562,392 A | * | 12/1985 | Davis et al. ................. | 318/572 |
| 4,713,770 A | * | 12/1987 | Hayes et al. ................. | 700/175 |
| 5,317,518 A | * | 5/1994 | Fujita et al. ................. | 700/184 |
| 5,323,325 A | | 6/1994 | Izumiya ................. | 364/474.16 |
| 5,414,632 A | | 5/1995 | Mochizuki et al. ..... | 364/474.16 |
| 5,446,672 A | | 8/1995 | Boldys ................... | 364/474.16 |
| 5,469,352 A | | 11/1995 | Yukutomt et al. .......... | 364/192 |
| 5,566,092 A | | 10/1996 | Wang et al. ........... | 364/551.02 |
| 5,568,028 A | * | 10/1996 | Uchiyama et al. .......... | 318/566 |
| 5,586,041 A | * | 12/1996 | Mangrulkar ................. | 700/174 |
| 5,587,915 A | | 12/1996 | Nagatomi ............... | 364/474.19 |
| 5,631,851 A | * | 5/1997 | Tanaka et al. ................. | 702/33 |
| 5,633,800 A | | 5/1997 | Bankert et al. ........ | 364/474.19 |
| 5,642,297 A | | 6/1997 | Brady et al. ................. | 364/559 |
| 5,757,648 A | | 5/1998 | Nakamura ............. | 364/474.11 |
| 5,812,406 A | | 9/1998 | Matsumoto ............ | 364/474.16 |

\* cited by examiner

*Primary Examiner*—Leo Picard
*Assistant Examiner*—Steven R. Garland
(74) *Attorney, Agent, or Firm*—John J. Elnitski, Jr.

(57) ABSTRACT

The present invention provides a visual drag diagnostic apparatus, software and method for CNC machines. The present invention creates a visual display or plot of the drag values associated with the CNC machine's moving components along each axis of movement of a tool holder or table. The plot created by the present invention provides a diagnostic tool to evaluate the operational status of the CNC machine, which is quick to perform and easy to understand by the operator. Knowing the drag values allows an operator to foresee problems with tool holder or table movement before making a product, thereby saving time and money during machining operations.

20 Claims, 2 Drawing Sheets

EXAMPE PLOT OF DRAG VALUES VS. MOVEMENT
OF A CNC MACHINE IN THE Y DIRECTION

VISUAL DRAG DIAGNOSTIC APPARATUS AND METHOD

This application claims the benefit of U.S. Provisional Application No.: 60/087,443 filed Jun. 1, 1998.

BACKGROUND

This invention relates to Computerized Numerical Control (CNC) machines. The CNC machines are used to create products by machining a raw material into a desired shape. The raw material is commonly referred to as a work piece. Operators of CNC machines are concerned about drag associated with moving components of the CNC machine. The drag associated with the moving components is encountered during the CNC machine's operation. The moving components of the CNC machine usually move a tool holder holding a cutting tool about the work piece or a table holding the work piece about a cutting tool. The moving components move the tool holder or table about the X, Y and Z axial planes of the work piece. The drag is usually a value measured as the force required to move the tool holder or table in any or all of the X, Y and Z axial planes. The force or drag is usually measured in terms of torque. A higher than normal drag value usually indicates a problem with the CNC machine, which could affect the proper operation of the CNC machine and/or the proper machining of the work piece. As an example, a higher than normal drag value for moving the tool holder or table could indicate that lubrication, cleaning or adjustment of the moving components is required.

It is an object of the present invention to insure proper operation of the CNC machine and prevent damage of the CNC machine by providing a capability to readily check the drag values of a CNC machine as compared to the CNC machine's normal range of acceptable operational drag values.

It is another object of the present invention to prevent defects in manufacture of a product by providing a capability to readily check the drag values of a CNC machine as compared to the CNC machine's normal range of acceptable operational drag values before machining the product.

SUMMARY

The present invention provides apparatus, software and a method for visually determining operational status of moving components of a CNC machine. The apparatus, software and method are used for monitoring and recording a force required to move the moving components of the CNC machine. They then plot the force on a visual display as feedback to an operator of the CNC machine. They also provide a reference on the visual display indicating acceptable maximum range of force allowable to move the moving components, such that the operator can compare the force plotted on the visual display to the reference provided at the CNC machine.

DESCRIPTION OF THE INVENTION

The present invention provides a visual drag diagnostic apparatus, software and method for CNC machines. The present invention creates a visual display or plot of the drag values associated with the CNC machine's moving components along each axis of movement of a tool holder or table. The plot created by the present invention provides a diagnostic tool to evaluate the operational status of the CNC machine, which is quick to perform and easy to understand by the operator. Knowing the drag values allows an operator to foresee problems with tool holder or table movement before making a product, thereby saving time and money during machining operations.

Typically, the moving components of the CNC machine move either the tool holder or the table holding a work piece. The tool holder or table is moved about the X, Y and Z axis of a work piece. The moving components associated with the tool holder or table are moved by one or more electric motors of the CNC machine. The torque required to move the moving components can be equated to the amount of electrical current required by a motor to move the moving components. The specifications of an electrical motor define how much torque is produced when a motor draws a given amount of electrical current. The motor specifications also provide a corresponding torque coefficient ratio to determine the torque value from the amount of electrical current used by the motor. Therefore, by moving the tool holder or table in any one direction, the torque required can be found by measuring the amount of electrical current used during the movement in that direction and multiplying that amount by the torque coefficient ratio of the motor. A torque monitoring device as part of the CNC machine monitors the torque required by monitoring and converting the value of electrical current used by the motor into a torque value. The torque monitoring device is usually a package of electronics and software for measuring electrical current and converting it to a torque value. The torque monitoring device can be part of an existing computer controlling the CNC machine or added to the CNC machine as part of the present invention.

Figure 1:
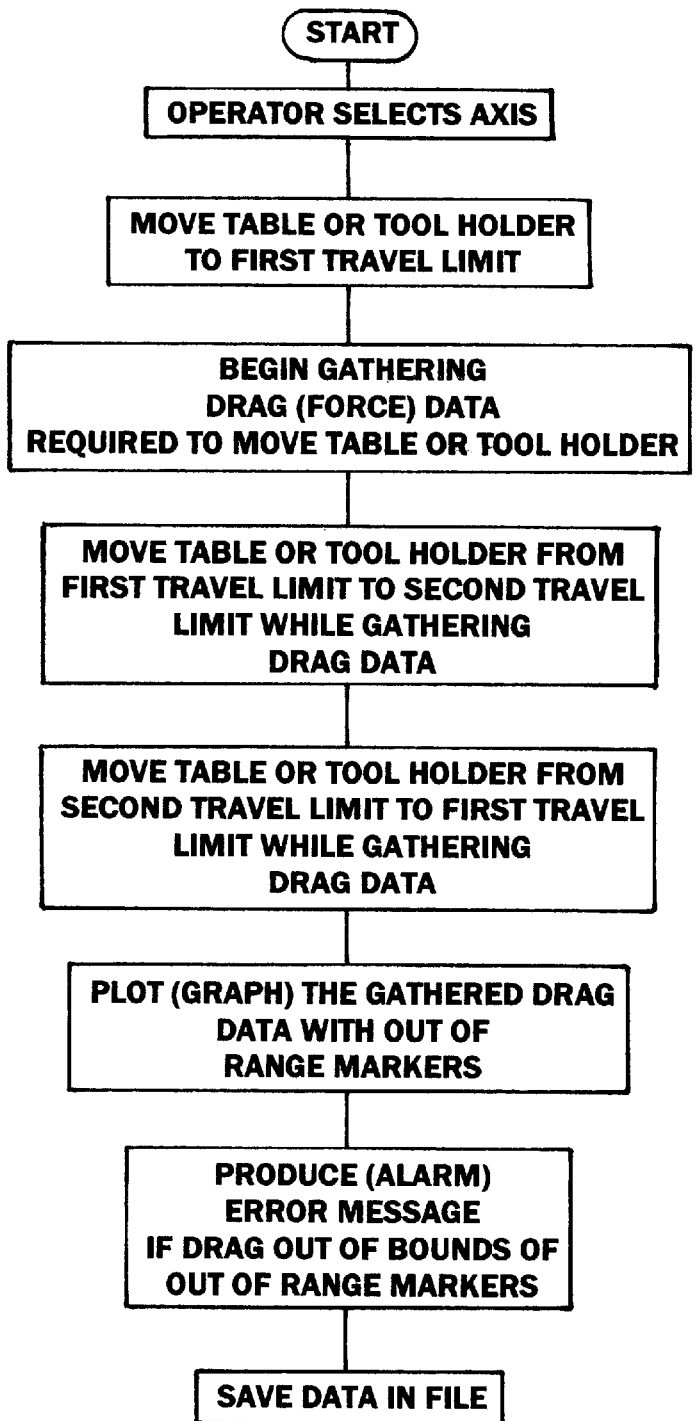
FIG. 1 is flow chart of the steps taken by software according to the present invention.

The visual drag diagnostic software of the present invention is embedded in an existing computer of the CNC machine or a computer attached to the CNC machine. The visual drag diagnostic software retrieves the torque values from whatever type of device is employed to monitor the electrical current used when moving the tool holder or table of the CNC machine. The computer which employs the visual drag diagnostic software is preferably part of the CNC machine's electronics, but could be a separate unit linked to the CNC machine. The visual drag diagnostic software performs the steps shown in the flow chart of FIG. 1 to provide the operator with information to determine the operational status of the CNC machine in real time and an easy fashion. The steps taken by the operator and drag diagnostic software record and present the drag values associated with the movement of the CNC machine's components as they move the tool holder or table. The software converts these drag values into information usable by the operator to determine if the CNC machine is operating properly.

The following is an example of the method for using the visual drag diagnostic software to evaluate a CNC machine having a table which moves the work piece in the X, Y and Z axial directions about a cutting tool. In this example, the work piece is mounted to the table and the table is moved in the X, Y and Z directions by the moving components of the CNC machine. As shown in the flow chart of FIG. 1, the visual drag diagnostic software would be started at a computer as part of or connected to the CNC machine. The operator would then chose one of the X, Y or Z axial directions of movement of the table for the recording of drag values. The visual drag diagnostic software then commands the moving components of the CNC machine to move the table along the chosen axis from a starting point towards a first travel limit associated with the chosen axis. A travel limit of the table is the distance in any one direction that the table is allowed to move. Therefore, a table would have a first and second travel limit for each of the X, Y and Z axial directions of movement. The starting point is the current position that the table is located on the CNC machine between the first and second travel limits of each axis. The starting point could also at one of the travel limits of the table. After the table reaches the first travel limit of the chosen axis, the visual drag diagnostic software prepares to begin receiving and recording the torque required to move the table. The visual drag diagnostic software then commands the table to move from the first travel limit to the second travel limit of the chosen axis. As the table moves, the visual drag diagnostic software receives and records the torque required to move the table from the first travel limit to the second travel limit of the chosen axis. The visual drag diagnostic software receives the drag data from some type of torque monitoring device. As discussed above, the torque monitoring device measures and converts the electrical current values used by the motor during movement of the table. Torque values are recorded for many points (approximately 100) throughout the movement of the table from the first travel limit to the second travel limit. The torque value data is then saved by the visual drag diagnostic software in memory of the computer for later presentation. The memory of the computer is any technology for storing data that is associated with the computer. The data gathering process for the torque values is then repeated by the visual drag diagnostic software in the reverse direction along the chosen axis between the second travel limit and the first travel limit of that axis. The torque value data from the reverse direction is then saved by the visual drag diagnostic software in the memory of the computer for later presentation. Surprisingly, the drag values can be very different between the direction of travel from first to second travel limit as compared to the direction of travel from second to first travel limit. Therefore, it is necessary as described above to record drag values along both directions of an axis of table movement.

Figure 2:
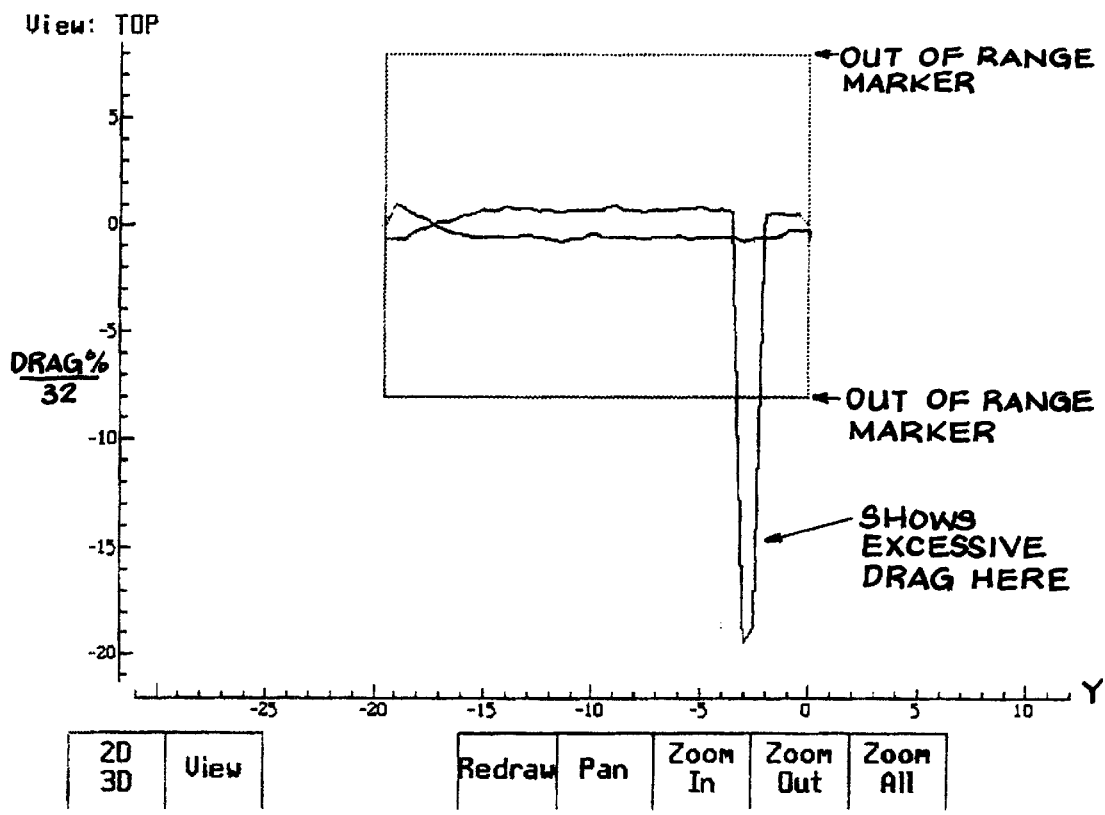
FIG. 2 is an example of plotted drag values on a visual display according to the present invention.

As shown in FIG. 2, the torque value data for both directions is then plotted on a visual display for observation by the operator. The vertical axis of the plot of FIG. 2 depicts the drag values, while the horizontal axis depicts the length of travel of the table along the axis of travel. In the case of the example above, the drag recorded for travel from the first travel limit to the second travel limit are shown as positive values on the vertical axis of the plot. The drag recorded for travel from the second travel limit to the first travel limit are shown as negative values on the vertical axis of the plot. The visual display is typically a CRT or LCD monitor, but could be any device which readily provides a visual plot of the collected drag data. Usually, the visual display is part of the CNC machine, but could be separate from the machine. The torque value plot can also be printed from the computer. The acceptable maximum drag values during normal operation of the CNC machine for both travel directions between travel limits of each axis are stored in the computer for reference. Positive and negative out of range markers based on the acceptable maximum drag values are plotted on the visual display for both travel directions between travel limits. The out of range markers indicate to the operator the limits of acceptable drag. FIG. 2 shows an example of a plot of torque values and out of range markers. FIG. 2 also shows an example of a drag values recorded which goes beyond the maximum acceptable drag values shown by the out range markers. The process described above is repeated for the other axis directions, as requested by the operator, to fully determine the operational status of the CNC machine.

Also, integrated as part of the visual drag diagnostic software is an error warning message. The error warning message is presented to the operator by the visual drag diagnostic software, if the drag exceeds the out of range markers in either direction. The error warning message to the operator can be a visual warning on the display, an audible warning from an attached audio source or a combination of both. It is envisioned that the software can be written to totally automate the process checking the drag values of all the moving components of the CNC machine, thereby deleting the step of the operator choosing the axis to be tested. It is also envisioned that the software could be written to record drag values of the moving components while the tool holder or table is moving in two or more axial planes.

While embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention which is to be given the full breadth of the appended claims and any and all equivalents thereof.

I claim:

1. A method, of visually determining operational status of moving components of a CNC machine prior to use of a tool to determine the operation status of the moving components of a CNC machine other than the tool, comprising:
    monitoring and recording a force prior to using a tool which is required to move said moving components other than the tool;
    plotting said force on a visual display on said visual display as feedback to an operator of said CNC machine; and
    providing a reference on said visual display indicating acceptable maximum range of force allowable to move said moving components, such that said operator can compare said force plotted on said visual display to said reference provided at said CNC machine.

2. The method of claim 1, wherein said moving components combine to move a single component of said CNC machine in X, Y and Z axial planes.

3. The method of claim 2, further including monitoring, recording and plotting said force for each of said axial planes at separate intervals.

4. The method of claim 2, further including providing a warning message if said force required to move said single component exceeds said acceptable maximum range of force allowable to move said moving components.

5. The method of claim 4, wherein said warning message is displayed on said visual display.

6. The method of claim 4, wherein said warning message is an audible alarm from an audio source.

7. The method of claim 2, wherein said single moving component is a tool holder of said CNC machine.

8. The method of claim 2, wherein said single moving component is a table of said CNC machine.

9. The method of claim 1, wherein said force is monitored by measuring electrical current required by at least one motor moving said moving components.

10. The method of claim 9, wherein said measured electrical current is converted into units of force.

11. A method of visually determining operational status of moving components of a CNC machine comprising:

monitoring and recording a force required to move said moving components, said moving components combining to move a single component of said CNC machine in X, Y and Z axial planes, and said movement of said single component along each of said axial planes includes a first and second limit of travel and further including recording said force as said single component is moved along a path from said first limit to said second limit; plotting said force on a visual display on said visual display as feedback to an operator of said CNC machine; and providing a reference on said visual display indicating acceptable maximum range of force allowable to move said moving components, such that said operator can compare said force plotted on said visual display to said reference provided at said CNC machine.

12. The method of claim 11, further including recording said force of moving said single component back along said path from said second limit to said first limit.

13. A method of visually determining operational status of moving components of a CNC machine comprising:

monitoring and recording a force required to move said moving components;

plotting said force on a visual display on said visual display as feedback to an operator of s aid CNC machine; and providing a reference on said visual display indicating acceptable maximum range of force allowable to move said moving components, such that said operator can compare said force plotted on said visual display to said reference provided at said CNC machine;

wherein said moving components combine to move a table of said CNC machine in X, Y and Z axial planes and further including monitoring, recording and plotting said force for movement of said table in each of said axial planes at separate intervals; wherein said movement of said table along each of said axial planes includes a first and second limit of travel and further including recording said force as said table is moved along a path from said first limit to said second limit and back again along said path from said second limit to said first limit; wherein said method further includes providing a warning message if said force required to move said table exceeds said acceptable maximum range of force allowable to move said moving components; and wherein said force is monitored by measuring electrical current required by at least one motor moving said moving components and said measured electrical current is converted into units of force.

14. The method of claim 13, wherein said method is performed using software and a computer.

15. The method of claim 14, wherein all functions of said method are automated.

16. The method of claim 14, wherein said force is recorded during movement of said table in at least two axial planes of movement.

17. The method of claim 13, furthering including saving said recorded force values for later use and presentation.

18. An apparatus for visual displaying the operational status of moving components of a CNC machine to an operator prior to use of a tool to determine the operation status of the moving components of a CNC machine other than the tool, comprising:

a computer connected to said CNC machine, said computer including software embedded to monitor, record and store drag values associated with movement of said moving components other than said tool, and store an acceptable range of maximum drag allowable as out of range markers; and a visual display to receive a plot of said recorded drag values and said out of range markers.

19. The apparatus of claim 18, further including a device to monitor electrical current used by at least one motor to move said moving components.

20. The apparatus of claim 18, wherein said moving components move a single component of said CNC machine and wherein said software commands movement of said single component by using said moving components, records said drag values associated with movement of said moving components and plots said recorded drag values and out of range markers on said visual display.

\* \* \* \* \*